US009827885B2

(12) United States Patent
Fisher et al.

(10) Patent No.: US 9,827,885 B2
(45) Date of Patent: Nov. 28, 2017

(54) POWER SEAT ASSEMBLY

(71) Applicant: Fisher & Company, Incorporated, St. Clair Shores, MI (US)

(72) Inventors: Michael R. Fisher, Grosse Pointe Farms, MI (US); James S. Maksymiuk, Richmond, MI (US); David L. Robinson, Sterling Heights, MI (US); Christopher J. Ryan, Fraser, MI (US); Andrew J. Simms, Royal Oak, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 81 days.

(21) Appl. No.: 14/738,511

(22) Filed: Jun. 12, 2015

(65) Prior Publication Data
US 2015/0375643 A1    Dec. 31, 2015

Related U.S. Application Data

(60) Provisional application No. 62/017,448, filed on Jun. 26, 2014.

(51) Int. Cl.
*A61G 5/14* (2006.01)
*B60N 2/30* (2006.01)
(Continued)

(52) U.S. Cl.
CPC ............ *B60N 2/309* (2013.01); *B60N 2/015* (2013.01); *B60N 2/0232* (2013.01); *B60N 2/22* (2013.01);
(Continued)

(58) Field of Classification Search
CPC .... B60N 2/3065; B60N 2/309; B60N 2/3011; B60N 2/2013; B60N 2/206; B60N 2/0284;
(Continued)

(56) References Cited

U.S. PATENT DOCUMENTS 6,899,392 B1 *   5/2005   Saberan ................. B60N 2/206
                                                            297/317
7,686,397 B2 *   3/2010   Sahi ........................ B60N 2/12
                                                            297/334
(Continued)

*Primary Examiner* — Syed A Islam
(74) *Attorney, Agent, or Firm* — Harness, Dickey & Pierce, P.L.C.

(57) ABSTRACT

A seat assembly is provided and may include a base assembly, a first arm, a seat bottom assembly, a second arm, and an adjustment arm. The base assembly may be mounted to a vehicle. The first arm may be rotatably coupled to the base assembly and may be operable to rotate relative to the base assembly about a first axis of rotation. The seat bottom assembly may be rotatably coupled to the first arm and may be operable to rotate relative to the first arm about a second axis of rotation. The second arm may be rotatably coupled to the seat bottom assembly and may be operable to rotate relative to the seat bottom assembly about a third axis of rotation. The adjustment arm may include an adjustment mechanism, and may be rotatably coupled to the second arm and rotatably coupled to the base assembly. The adjustment mechanism may be operable to rotate the adjustment arm relative to the base assembly about a fourth axis of rotation.

17 Claims, 6 Drawing Sheets

(51) Int. Cl.
*B60N 2/015* (2006.01)
*B60N 2/02* (2006.01)
*B60N 2/22* (2006.01)
*B60N 2/20* (2006.01)
*A47C 1/022* (2006.01)
*A47C 7/02* (2006.01)
*A47C 1/023* (2006.01)

(52) U.S. Cl.
CPC ......... *B60N 2/3013* (2013.01); *B60N 2/3022* (2013.01); *B60N 2/3065* (2013.01); *A47C 1/022* (2013.01); *A47C 1/023* (2013.01); *A47C 7/02* (2013.01); *A61G 5/14* (2013.01); *B60N 2/0284* (2013.01); *B60N 2/206* (2013.01)

(58) Field of Classification Search
CPC ........... A47C 1/023; A47C 1/022; A47C 7/02; A61G 5/14
USPC ....... 297/334, 353–383, 337, 338, 347, 317, 297/313, 311
See application file for complete search history.

(56) References Cited

U.S. PATENT DOCUMENTS

| | | | | |
|---|---|---|---|---|
| 8,474,910 | B2* | 7/2013 | Kammerer | B60N 2/12 296/65.09 |
| 8,590,970 | B2* | 11/2013 | Takakura | B60N 2/062 297/331 |
| 9,283,873 | B2* | 3/2016 | Line | B60N 2/3065 |
| 2010/0283301 | A1* | 11/2010 | Shanmugam | B60N 2/12 297/344.1 |
| 2011/0043017 | A1* | 2/2011 | Kokubo | B60N 2/0232 297/337 |
| 2012/0228913 | A1* | 9/2012 | Hurst | B60N 2/12 297/354.12 |
| 2015/0202996 | A1* | 7/2015 | Kajale | B60N 2/206 297/363 |

* cited by examiner

POWER SEAT ASSEMBLY

CROSS-REFERENCE TO RELATED APPLICATIONS

This application claims the benefit of U.S. Provisional Application No. 62/017,448, filed on Jun. 26, 2014. The entire disclosure of the above application is incorporated herein by reference.

FIELD

The present disclosure relates to a power seat assembly, and more specifically to a multi-action folding power seat assembly.

BACKGROUND

This section provides background information related to the present disclosure which is not necessarily prior art.

Sport utility and other vehicles accommodating multiple rows of seats are becoming increasingly popular. While providing a vehicle with multiple rows of seating maximizes the number of occupants that can be transported by the vehicle, such additional rows of seating provide challenges to vehicle manufacturers, as access to rear seat assemblies such as second or third-row seat assemblies is often obstructed by front or other intermediate seat assemblies.

Conventional seat assemblies typically include at least one adjustment mechanism that allows a user to pivot, slide, or otherwise move the seat assembly in an effort to permit access to rear seat assemblies and/or to a cargo are of a vehicle. For example, a second-row seat assembly may permit a user to rotate a seatback relative to a seat bottom and into a fold-flat position. Once in the fold-flat position, the second-row seat assembly may pivot forward or "dump" along with the seat bottom, thereby providing access to a third-row seat. In another configuration, an easy-entry mechanism may allow a seatback to rotate forward relative to a seat bottom to permit access to a third-row seat without moving the seat bottom.

A seat assembly may additionally include a recliner mechanism that provides for angular adjustment of the seatback relative to the seat bottom. Such recliner mechanisms permit a user to position a seatback relative to a seat bottom when the seat assembly is in an upright and usable position to allow the user to position the seatback in a comfortable position.

While conventional seat assemblies may include an easy-entry mechanism that permits the seat assembly to be moved quickly into a forward or easy-entry position to permit access to a rear seat or cargo area of a vehicle, for example, such easy-entry mechanisms often require the user to control various mechanisms in order to move the seat assembly into such a position. Moreover, conventional seat assemblies and easy-entry mechanisms require a large amount of space in order to move into the required, or user-requested, positions. This can present a challenge to vehicle manufacturers as vehicles become smaller and packaging constraints become tighter.

SUMMARY

This section provides a general summary of the disclosure, and is not a comprehensive disclosure of its full scope or all of its features.

A seat assembly is provided and may include a base, a first arm, a support bracket, a second arm, an adjustment arm, and an adjustment mechanism. The first arm may be rotatably coupled to the base and may rotate relative to the base about a first axis of rotation. The support bracket may be rotatably coupled to the first arm and may rotate relative to the first arm about a second axis of rotation. The third arm may be rotatably coupled to the support bracket and may rotate relative to the support bracket about a third axis of rotation. The adjustment arm may be rotatably coupled to the second arm and rotatably coupled to the base. The adjustment mechanism may rotate the adjustment arm relative to the base about a fourth axis of rotation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
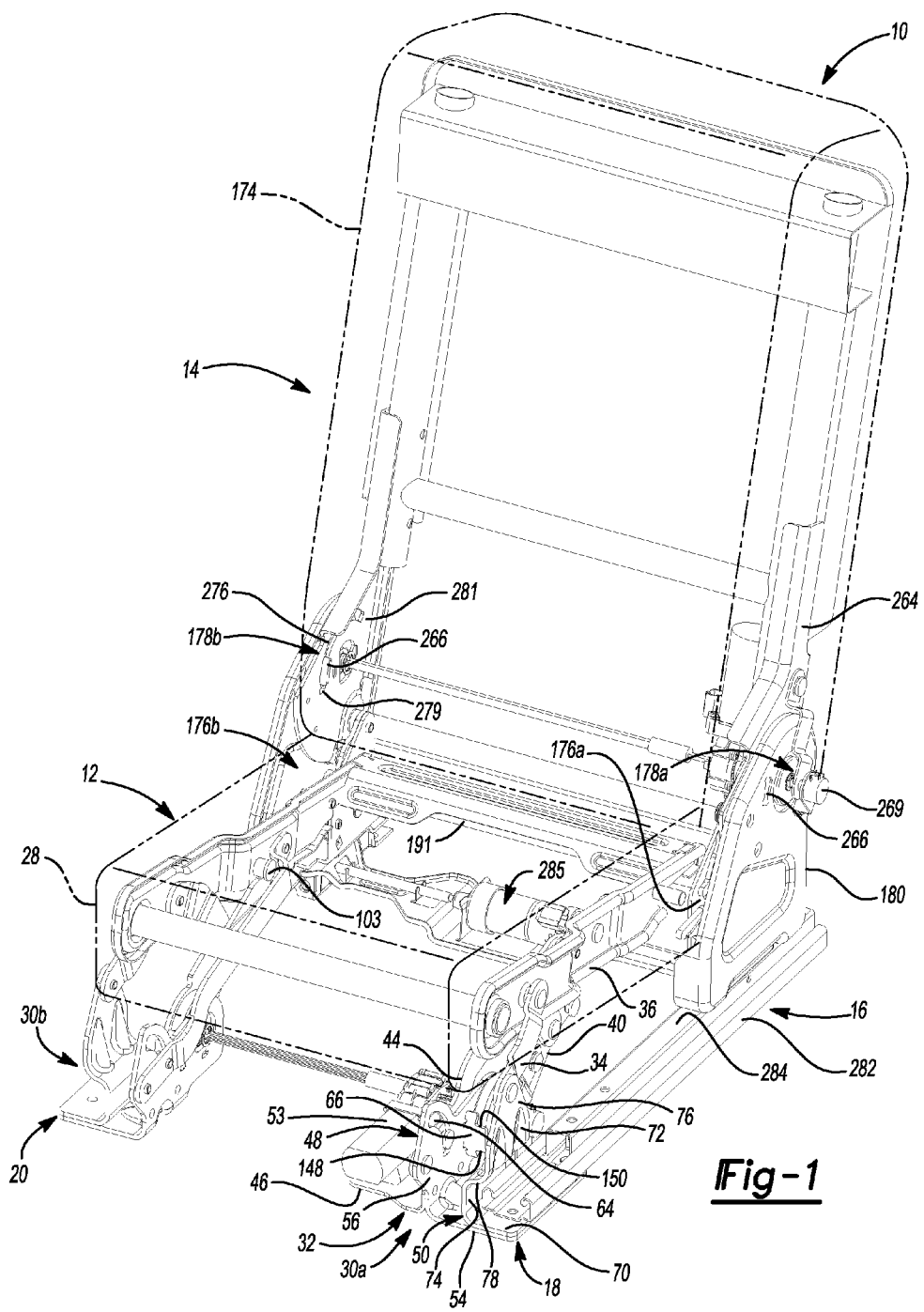
FIG. 1 is a perspective view of a seat assembly in a first configuration, in accordance with the principles of the present disclosure.
Figure 2:
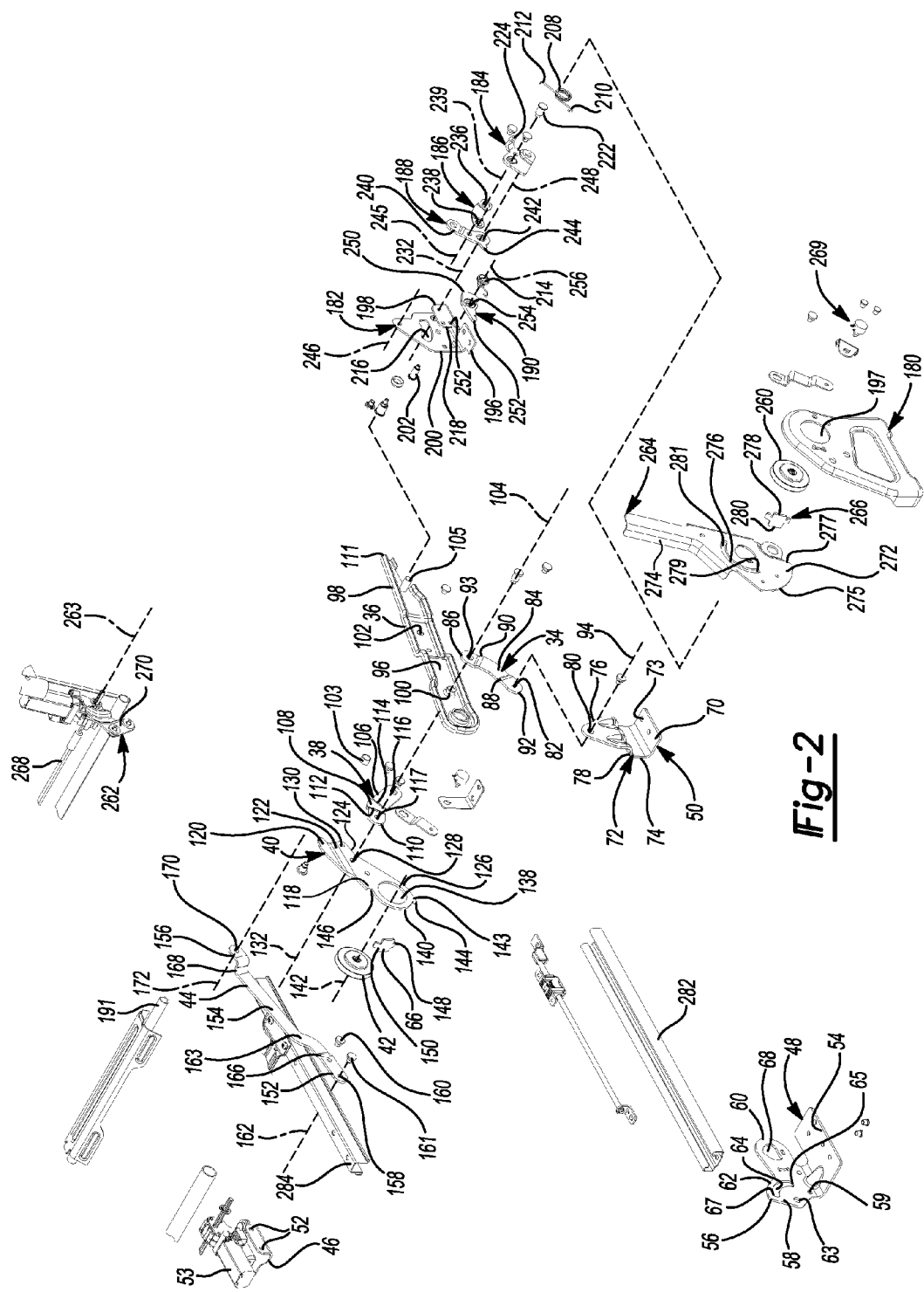
FIG. 2 is a partial exploded view of the seat assembly of FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a seat assembly 10 is provided. The seat assembly 10 may include a seat bottom assembly 12, a seat back assembly 14, and a seat track assembly 16.

The seat bottom assembly 12 may include a seat bottom 28 and at least one adjustment assembly 30. The seat bottom 28 may be mounted to, and supported by, the adjustment assembly 30. In one configuration, the seat bottom assembly 12 includes a first adjustment assembly 30a disposed on a first lateral side 18 of the seat assembly 10 and a second adjustment assembly 30b disposed on a second lateral side 20 of the seat assembly 10. The first adjustment assembly 30a is substantially identical to, and laterally aligned with, the second adjustment assembly 30b. Accordingly, references herein to the adjustment assembly 30 will be understood to apply equally to the first adjustment assembly 30a and the second adjustment assembly 30b, except as otherwise noted.

The adjustment assembly 30 may include a base assembly 32, a first arm 34, a support arm 36, a second arm 38, an adjustment arm 40, an adjustment mechanism 42, and a third arm 44. As illustrated, the adjustment assembly 30 may define two four-bar linkages operating in parallel to each other. The first four-bar linkage may include, and be defined by, the first arm 34, the second arm 38, and the adjustment arm 40. The second four-bar linkage may include, and be defined by, the first arm 34, the support arm 36, and the third arm 44. Operation of the four-bar linkages will be described in more detail below.

The base assembly 32 may include a base 46, a first support bracket 48 and a second support bracket 50. At least one of the base 46, the first support bracket 48 and the support bracket 50 may be secured to a portion of a vehicle, such as a vehicle floorpan. While the base 46, the first support bracket 48 and the second support bracket 50 are described herein as separate components attached by apertures (or similar mounting features) and bolts (or similar attachment features), the base 46, the first support bracket 48, and/or the second support bracket 50 may be integrally formed from the same piece of material by stamping, or a similar process. Likewise, the base 46 may be attached to the first support bracket 48, and/or the first support bracket 48 may be attached to the second support bracket 50, by welding, or a similar process. The base 46 may be a motor attachment bracket, operable to support a motor 53 for actuating the adjustment assembly 30, as will be explained in more detail below.

The first support bracket 48 may be secured to a vehicle (not shown) and may include a plurality of apertures 52 or similar mounting features and a corresponding plurality of screws, bolts, pins, or similar attachment features (not shown) for coupling the base assembly 32 to the first support bracket 48. The first support bracket 48 may include a first lateral portion 54 and a first vertical portion 56. The first vertical portion 56 may extend substantially perpendicularly from the first lateral portion 54 and may include a first lobe 58, a second lobe 60, and plurality of apertures 59 or similar mounting features for coupling the first vertical portion 56 to the corresponding plurality of apertures 52 on the base 46. The first lobe 58 may include a first arcuate edge 62 extending from the second lobe 60, an arcuate slot 64, and a first mounting aperture 63. The arcuate slot 64 may be generally parallel to the arcuate edge 62, and may extend between a first end 65 and a second end 67. The second lobe 60 may be substantially U-shaped and include a second mounting aperture 68. An arcuate stop member 66 (FIG. 3) may extend from the second lobe 60 in a direction substantially perpendicular to the first vertical portion. As will be described in more detail below, the arcuate stop member 66 may limit the rotation of the adjustment mechanism 42 in a first direction and a second direction.

The second support bracket 50 may include a second lateral portion 70 and a second vertical portion 72. The second lateral portion 70 may include a plurality of apertures 73 for coupling the second lateral portion 70 to the seat track assembly 16 and/or to the first lateral portion 54 of the first support bracket 48. The second vertical portion 72 may include a first part 74 and a second part 76. The second part 76 may be laterally offset from the first part 74 in a first direction by an elbow portion 78. The second part 76 of the second vertical portion 72 may include a second mounting aperture 80 for coupling the second support bracket 50 to the first arm 34.

The first arm 34 may include a first end portion 82, a central portion 84, and a second end portion 86. The central portion 84 may have a generally arcuate shape extending longitudinally between the first end portion 82 and the second end portion 86. The central portion 84 may be laterally offset from the first end portion 82 in a second direction (opposite the first direction) by a first elbow portion 88. The second end portion 86 may be laterally offset from the central portion 84 in the second direction by a second elbow portion 90. The first and second end portions 82, 86 may include mounting apertures 92, 93, respectively, or similar mounting feature. The mounting aperture 92 of the first end portion 82 may be rotatably coupled to the mounting aperture 80 of the second support bracket 50, for rotation relative to the second vertical portion 72 about a first axis of rotation 94.

The support arm 36 may include a beam portion 96 and a substantially U-shaped lip portion 98. The lip portion 98 may be integrally formed with the beam portion 96 and may provide strength to the support arm 36 for supporting the seat bottom 28. The beam portion 96 may include a first aperture 100, a second aperture 102, a first peg element 103, and a second peg element 105. The first aperture 100 may be rotatably coupled to the mounting aperture 93 of the first arm 34, for rotation relative to the first arm 34 about a second axis of rotation 104. The first peg element 103 may be substantially cylindrical and may be rotatably mounted to a first side of the beam portion 96 between the first aperture 100 and the second aperture 102. The first peg element 103 may contact, and rest upon, the adjustment arm 40 during operation of the adjustment assembly 30, as will be described in greater detail below. The second peg element 105 may be substantially cylindrical and may be mounted to a second side of the beam portion 96 between the first peg element 103 and a distal end 111 of the support arm 36.

The second arm 38 may include a first end portion 106, a central portion 108, and a second end portion 110. The central portion 108 may have a generally arcuate shape extending longitudinally between the first end portion 106 and the second end portion 110. The central portion 108 may be laterally offset from the first end portion 106 in the second direction by a first elbow portion 112. The second end portion 110 may be further laterally offset from the central portion 108 in the second direction by a second elbow portion 114. The first and second end portions 106, 110 may include first and second mounting apertures 116, 117, respectively, or similar mounting features. The first mounting aperture 116 of the first end portion 106 may be rotatably coupled to the first aperture 100 of the support arm 36, for rotation relative to the support arm 36 about the second axis of rotation 104.

The adjustment arm 40 may include a first portion 118 and a second portion 120. The second portion 120 may be laterally offset from the first portion 118 in the second direction by an elbow portion 122. The first portion 118 may include a first end 124 and a second end 126. The first end 124 may be generally narrower than the second end 126 and may include a first mounting aperture 128 and a peg member 130. The first mounting aperture 128 may be rotatably coupled to the second mounting aperture 117 of the second arm 38, for rotation relative to the second arm 38 about a third axis of rotation 132.

The second end 126 of the first portion 118 may further include a second mounting aperture 138 and an arcuate recessed portion 140. The second mounting aperture 138 may be rotatably coupled to the second mounting aperture 68 of the first support bracket 48, for rotation relative to the first support bracket 48 about a fourth axis of rotation 142. The arcuate recessed portion 140 may be formed in a peripheral edge 143 of the first portion 118, and may include a first end 144 and a second end 146. The first end 144 may limit the rotation of the adjustment arm 40 in the first direction by resting against a first side 148 of the arcuate stop member 66. The second end 146 may limit the rotation of the adjustment arm 40 in the second direction by resting against a second side 150 of the arcuate stop member 66. The first end 144 may be offset from the second end 146 by approximately one hundred and ten degrees (110°) to two hundred and ten degrees (210°) relative to the fourth axis of rotation 142. In one configuration, the first end 144 may be offset from the second end 146 by approximately one hundred and eighty degrees (180°).

The third arm 44 may include a first portion 152, a second portion 154, and a third portion 156. The first portion 152 may include a first mounting aperture 158 and a mounting pin 160. The first mounting aperture 158 may be rotatably coupled to the first mounting aperture 63 of the first lobe 58, by a mounting pin 161, for rotation of the third arm 44 relative to the base assembly 32 about a fifth axis of rotation 162. The mounting pin 160 may be slidably or rotatably received by the arcuate slot 64 of the first lobe 58.

The second portion 154 may include a generally S-shaped portion 163. The second portion 154 may be laterally offset from the first portion 152 in the second direction by a first elbow portion 166. The S-shaped portion 163 may extend between the first elbow portion 166 and the third portion 156. The third portion 156 may be laterally offset from the S-shaped portion 163 in the first direction by a second elbow portion 168 and may include a third mounting aperture 170. The third mounting aperture 170 may be rotatably coupled to the second aperture 102 of the support arm 36 for rotation of the third arm 44 relative to the support arm 36 about a sixth axis of rotation 172. The third arm 44 may provide lateral support to the support arm 36 during operation of the adjustment assembly 30, and may also prevent the support arm 36 from rotating about the second axis of rotation 104 during operation of the adjustment assembly 30.

The adjustment mechanism 42 may be coupled to the second mounting aperture 138 of the adjustment arm 40 and the second mounting aperture 68 of the first support bracket 48. While the adjustment mechanism 42 is shown as being a constantly engaged, round-adjustment mechanism, the adjustment mechanism 42 could alternatively be a discontinuous round-adjustment mechanism. Further, the adjustment mechanism 42 can either be a powered, round-adjustment mechanism or a manually-actuated round-adjustment mechanism. The adjustment mechanism 42 may selectively permit rotation of the adjustment arm 40 and, therefore, the seat bottom 28 relative to the base assembly 32.

The seat back assembly 14 may include a seat back 174, at least one linkage assembly 176 (FIG. 4), and at least one recliner assembly 178. The seat back 174 may be coupled to the at least one recliner assembly 178 for selective rotational movement of the seat back 174 relative to the seat track assembly 16 and the seat bottom assembly 12. In one configuration, the seat back assembly 14 includes a first linkage assembly 176a disposed on the first lateral side 18 of the seat assembly 10 and a second linkage assembly 176b disposed on the second lateral side 20 of the seat assembly 10. Likewise, in one configuration, the seat back assembly 14 includes a first recliner assembly 178a disposed on the first lateral side 18 of the seat assembly 10, and a second recliner assembly 178b disposed on second lateral side 20 of the seat assembly 10. The first linkage assembly 176a and first recliner assembly 178a are substantially identical to, and laterally aligned with, the second linkage assembly 176b and second recliner assembly 178b, respectively. Accordingly, references herein to the linkage assembly 176 and the recliner assembly 178 will be understood to apply equally to the first and second linkage assemblies 176a, 176b and the first and second recliner assemblies 178a, 178b, respectively, except as otherwise noted.

The linkage assembly 176 may include a first support bracket 180, a second support bracket 182, an actuator arm 184, a connecting arm 186, a release arm 188, an interlock arm 190, and a connecting rod 191 (FIG. 1). The first support bracket 180 may include an aperture 197 for coupling the recliner assembly 178 to the first support bracket 180. As will be described in more detail below, the first support bracket 180 may be coupled to the seat track assembly 16 by welding, mechanical fasteners, or other fastening systems for translational movement of the first support bracket 180 relative to the seat bottom assembly 12.

The second support bracket 182 may include a lateral portion 196, a first vertical portion 198 and a second vertical portion 200. The lateral portion 196 may be coupled to the first support bracket 180 by welding, mechanical fasteners, or other fastening systems for translational movement of the second support bracket 182 with the first support bracket 180 relative to the seat bottom assembly 12. The first and second vertical portions 198, 200 of the second support bracket 182 may be integrally formed with the lateral portion 196, and may further include a substantially cylindrically-shaped support pin 202 extending between the first and second vertical portions 198, 200. The first vertical portion 198 may include a mounting portion 204 and a catch portion 206. The mounting portion 204 may be a cylindrical hub integrally formed with the first vertical portion 198. A biasing member 208, such as a torsional spring, may be disposed on the mounting portion 204. A first end 210 of the biasing member 208 may be disposed in the catch portion 206. A second end 212 of the biasing member 208 may be coupled to the actuator arm 184. As will be explained in more detail below, when the actuator arm 184 is rotated in the first direction with respect to the second support bracket 182, the first end 210 of the biasing member 208 may prevent the biasing member from rotating in the first direction, while the second end 212 of the biasing member 208 may apply a torque on the actuator arm 184 in the second direction, opposite the first direction. The second vertical portion 200 of the second support bracket 182 may include a mounting element 214, an arcuate slot 216 for slidably receiving the connecting rod 191, and a stop element 218.

The actuator arm 184 may include a stop element 222 and a flanged portion 224. The stop element 222 may be a substantially cylindrical member extending from the actuator arm 184 in a direction substantially parallel to the first axis of rotation 94. The flanged portion 224 may extend from the actuator arm 184 in a direction substantially parallel to the first axis of rotation 94. The actuator arm 184 may be rotatably coupled to the first vertical portion 198 of the second support bracket 182 for rotation relative to the second support bracket 182 about a seventh axis of rotation 232. In one configuration, the seventh axis of rotation 232 may extend through the center of the mounting portion 204 of the first vertical portion 198.

The connecting arm 186 may be substantially arcuate-shaped and may include a first end 236 and a second end 238. The first end 236 may be rotatably coupled to the actuator arm 184 for rotation relative to the actuator arm 184 about an eighth axis of rotation 239.

The release arm 188 may be substantially arcuate-shaped and may include a first end 240, a second end 242, and a finger element 244. The first end 240 of the release arm 188 may be rotatably coupled to the second support bracket 182 for rotation relative to the second support bracket 182 about a ninth axis of rotation 246. The second end 238 of the connecting arm 186 may be rotatably coupled to the release arm 188 between the first end 240 and second end 242 thereof, for rotation relative to the release arm 188 about a tenth axis of rotation 245. The second end 242 of the release arm 188 may be rotatably coupled to the first end 220 of the connecting rod 191 for rotation relative to the connecting rod 191 about an eleventh axis of rotation 248. The finger element 244 may extend from the second end 242 of the release arm 188 in a direction substantially perpendicular to the eleventh axis of rotation 248.

The interlock arm 190 may include a first end 250 and a second end 252. A mounting aperture 254 may be disposed between the first end 250 and the second end 252. The mounting aperture 254 may be rotatably coupled to the mounting element 214 of the second vertical portion 200, such that the interlock arm 190 rotates relative to the second support bracket 182 about a twelfth axis of rotation 256. A biasing member 258, such as a torsional spring, may also be coupled to the mounting element 214. The biasing member 258 may include a first end 259 disposed at the second end 252 of the interlock arm 190, and a second end 261 coupled to the mounting element 214. As will be explained in more detail below, when the interlock arm 190 is rotated in the second direction with respect to the second support bracket 182, the biasing member 258 may apply a torque on the interlock arm 190 in the first direction. In the first configuration, the interlock arm 190 may rest against the stop element 218 of the second support bracket 182, such that the stop element 218 prevents the interlock arm 190 from rotating in the first direction.

The recliner assembly 178 may include a recliner mechanism 260, a drive arm 262 (FIG. 3), an actuator arm 264, a stop plate 266 (FIG. 1), and a sensor assembly 269 (FIG. 1). The recliner mechanism 260 may be a continuous or constantly engaged recliner mechanism that is either manually actuated or is actuated via a motor. Conversely, the recliner mechanism 260 may be a discontinuous mechanism movable between a locked state and an unlocked state either manually or via a powered unit. While the recliner mechanism 260 may be either a continuous recliner mechanism or a discontinuous mechanism, the recliner mechanism 260 is shown as being a continuous recliner mechanism.

The drive arm 262 may include a first portion 268 and a second portion 270 extending perpendicularly from the first portion 268. The first portion 268 may be mounted on the recliner mechanism 260 such that the drive arm 262 rotates relative to the recliner mechanism 260 about a thirteenth axis of rotation 263 when the recliner mechanism 260 is actuated.

The actuator arm 264 may include a proximal end 272 and a distal end 274. The proximal end 272 may be coupled to the second portion 270 of the drive arm 262. The distal end 274 may be coupled to the seat back 174. Accordingly, the actuator arm 264 and the seat back 174 may rotate with the drive arm 262 when the recliner mechanism 260 is actuated. The proximal end 272 of the actuator arm 264 may further include an arcuate collar 275 having an abutment end 277, and an arcuate slot 276 having a first end 279 and a second end 281. The arcuate collar 275 and the arcuate slot 276 may be disposed substantially concentric to the thirteenth axis of rotation 263. The stop plate 266 may be arcuately-shaped and have a radius of curvature substantially equal to a radius of curvature of the arcuate slot 276. A first end 278 of the stop plate 266 may be mounted to the first support bracket 180. A second end 280 of the stop plate 266 may extend into the arcuate slot 276.

The sensor assembly 269 may include a Hall Effect sensor, a rheostat sensor, or similar sensing device that is able to sense a direction and angle of rotation of the recliner mechanism 260. The sensor assembly 269 may also include a memory device (not shown) and/or may communicate with the memory device such that the direction, angle, and other rotational characteristics of the recliner mechanism 260 can be stored for later use and application, as will be discussed in more detail below.

The seat track assembly 16 may include a track 282 and a slide mechanism 284. In one configuration, the seat back assembly 14 may include a pair of seat track assemblies 16, whereby each assembly 16 includes a track 282 and a slide mechanism 284. The track 282 may be fixed to a structure such as the vehicle floorpan or other external structure (neither shown), for example. The slide mechanism 284 may be mounted to the first support bracket 180 of the seat back assembly 14 and may be slidably disposed within the corresponding track 282, such that the slide mechanism 284, the first support bracket 180, and the seat back assembly 14 are translatable relative to the track 282. The slide mechanism 284 may slide within the track 282 by either manual or powered operation. For example, the seat track assembly 16 may include a motor 285 that is coupled to the slide mechanism 284 to slide the slide mechanism 284 relative to the track 282.

Operation of the seat assembly 10, and specifically the seat bottom assembly 12, the seat back assembly 14, and the seat track assembly 16, will now be described in more detail. With reference to FIG. 1, in the first configuration, the first end 279 of the arcuate slot 276 may rest against the stop plate 266 of the seat back assembly 14, thus preventing the seat back 174 from rotating in the first direction about the thirteenth axis of rotation 263. The support arm 36 of the seat bottom assembly 12 may rest on, and be supported by, the connecting rod 191 of the seat back assembly 14, such that the adjustment arm 40 of the seat bottom assembly 12 is prevented from rotating in the first direction about the fourth axis of rotation 142.

Figure 5:
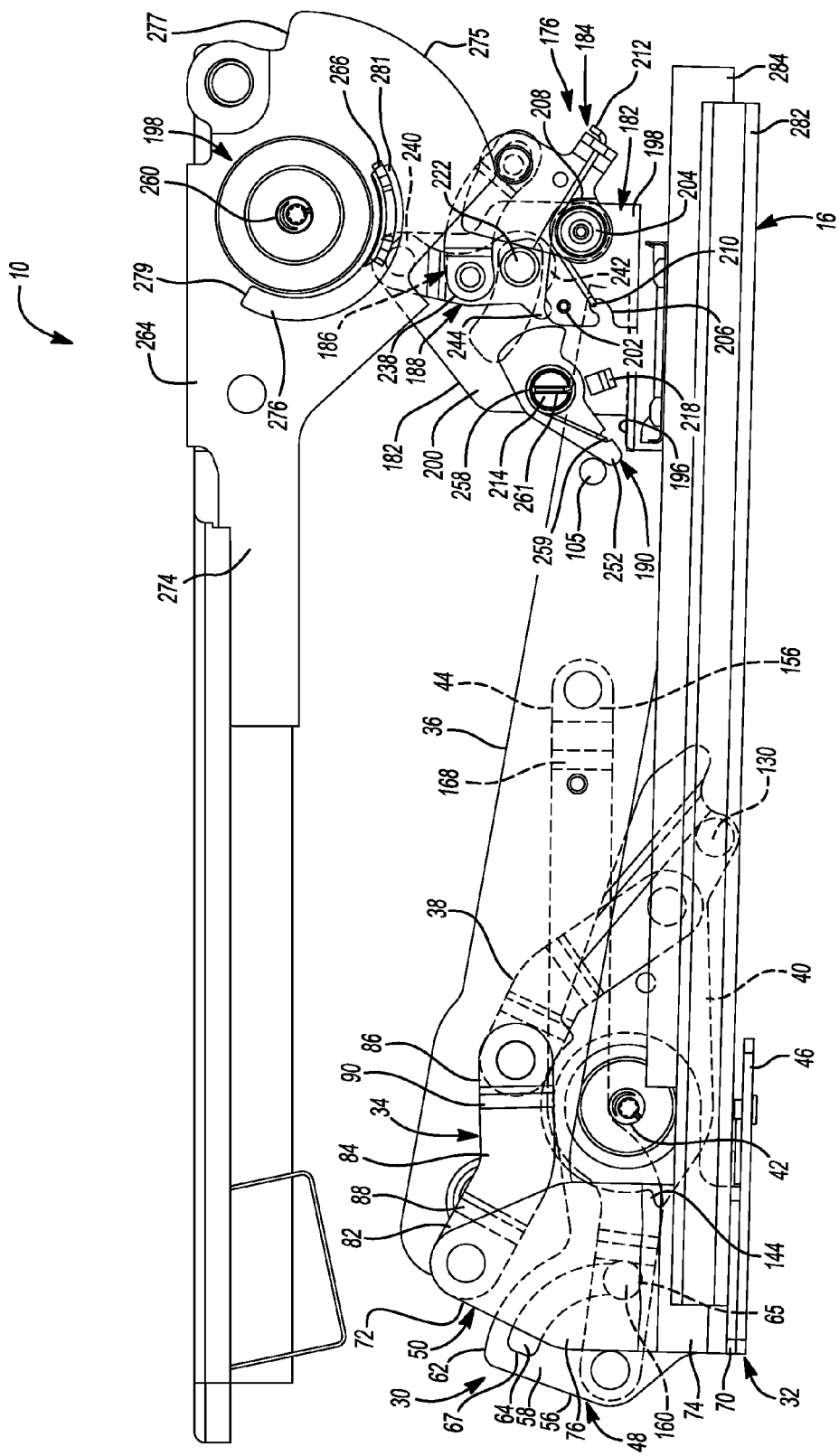
FIG. 5 is a first side view of the seat assembly of FIG. 1 in a third configuration.

With reference to FIG. 5, in a first mode of operation, the recliner mechanism 260 of the seat back assembly 14 may cause the actuator arm 264 and the seat back 174 to rotate in the second direction about the thirteenth axis of rotation 263. As the actuator arm 264 rotates in the second direction, the abutment end 277 of the actuator arm 264 contacts the stop element 222 of the actuator arm 184 and rotates the actuator arm 184 in the first direction about the seventh axis of rotation 232. As the actuator arm 264 continues to rotate, the arcuate collar 275 may slide or otherwise move along the stop element 222, thereby rotating the actuator arm 184 further in the first direction. Rotation of the actuator arm 184 urges or otherwise moves the connecting arm 186, which causes the release arm 188 to rotate in the second direction about the ninth axis of rotation 246, and further causes the connecting rod 191 to move within the arcuate slot 216 of the second support bracket 182. Once the connecting rod 191 has sufficiently moved within the arcuate slot 216, the support arm 36 of the seat bottom assembly 12 will no longer rest on, or be supported by, the connecting rod 191, such that the adjustment mechanism 42 is able to rotate the adjustment arm 40 in the first direction about the fourth axis of rotation 142.

Rotation of the adjustment arm 40 in the first direction about the fourth axis of rotation 142 will cause the second arm 38 of the seat bottom assembly 12 to rotate in the second direction about the third axis of rotation 132, and further cause the support arm 36 and, thus, the seat bottom 28, to rotate in the first direction about the second axis of rotation 104. Rotation of the support arm 36 and the seat bottom 28 about the second axis of rotation 104 causes the first arm 34 to rotate in the first direction about the first axis of rotation 94, and causes the third arm 44 to rotate in the first direction about the fifth axis of rotation 162. As the third arm 44 rotates about the fifth axis of rotation 162, the mounting pin 160 slides or rotates within the arcuate slot 64 until the adjustment assembly 30 and the seat bottom 28 reach the second configuration (FIG. 5). In the second configuration, the first end 144 of the adjustment arm 40 rests against the first side 148 of the arcuate stop member 66 and the mounting pin 160 slides or rotates to the second end 67 of the arcuate slot 64, thereby preventing further rotation of the adjustment arm 40 and the seat bottom 28 in the first direction.

When the support arm 36 and, thus, the seat bottom 28, rotate in the first direction about the second axis of rotation 104, as described above, the second peg element 105 of the support arm 36 contacts the second end 252 of the interlock arm 190 and causes the interlock arm 190 to rotate in the second direction about the twelfth axis of rotation 256. When the interlock arm 190 rotates in the second direction about the twelfth axis of rotation 256, the first end 250 of the interlock arm 190 may contact, or otherwise be adjacent to, the finger element 244 of the release arm 188. In this way, the first end 250 of the interlock arm 190 prevents the release arm 188 from rotating in the first direction about the ninth axis of rotation 246 and, thus, prevents the actuator arm 184 from rotating in the second direction about the seventh axis of rotation 232. Accordingly, the connecting rod 191 is prevented from moving within the arcuate slot 216 and returning to the first configuration. It will be appreciated, therefore, that the interlock arm 190 prevents the seat back 14 from returning to the first configuration when the seat bottom 12 is in the second configuration.

With the seat bottom 28 in the second configuration (FIG. 5), the recliner mechanism 260 of the seat back assembly 14 may rotate further in the second direction about the thirteenth axis of rotation 263, until the seat back 174 reaches a second configuration (FIG. 5), in which the seat back 174 is substantially horizontal, or substantially parallel to the track 282 of the seat track assembly 16.

To return the seat bottom assembly 12 and the seat back assembly 14 to the first configuration (FIG. 1) from the second configuration (FIG. 5), the adjustment mechanism 42 rotates the adjustment arm 40 of the seat bottom assembly 12 in the second direction about the fourth axis of rotation 142. Rotation of the adjustment arm 40 in the second direction about the fourth axis of rotation 142 causes the second arm 38 of the seat bottom assembly 12 to rotate in the first direction about the third axis of rotation 132. Rotation of the second arm 38 about the third axis of rotation 132 causes the support arm 36 and, thus, the seat bottom 28, to rotate in the second direction about the second axis of rotation 104.

Rotation of the seat bottom 28 in the second direction about the second axis of rotation 104 causes the second peg element 105 of the support arm 36 to disengage from the second end 252 of the interlock arm 190. Disengagement of the second peg element 105 from the interlock arm 190 allows the force or torque of the biasing member 258 to rotate the interlock arm 190 in the first direction about the twelfth axis of rotation 256. After the interlock arm 190 has sufficiently rotated in the first direction, the first end 250 of the interlock arm no longer prevents the release arm 188 from rotating in the first direction about the ninth axis of rotation 246. Accordingly, after the interlock arm 190 has rotated back into the first configuration (FIG. 4), the recliner mechanism 260 may cause the actuator arm 264 and the seat back 174 to rotate in the first direction about the thirteenth axis of rotation 263. As the actuator arm 264 rotates in the first direction, the arcuate collar 275 may slide or otherwise move along the stop element 222, thereby allowing the biasing member 208 to rotate the actuator arm 184 in the second direction about the seventh axis of rotation 232. As the actuator arm 264 rotates in the second direction, it may cause the release arm 188 to rotate in the first direction about the ninth axis of rotation 246, and further causes the connecting rod 191 to move within the arcuate slot 216 of the second support bracket 182. Once the connecting rod 191 has sufficiently moved within the arcuate slot 216, and into the first configuration (FIG. 4), the support arm 36 of the seat bottom assembly 12 can operably rest on, or be supported by, the connecting rod 191, as illustrated in FIG. 1.

Figure 3:
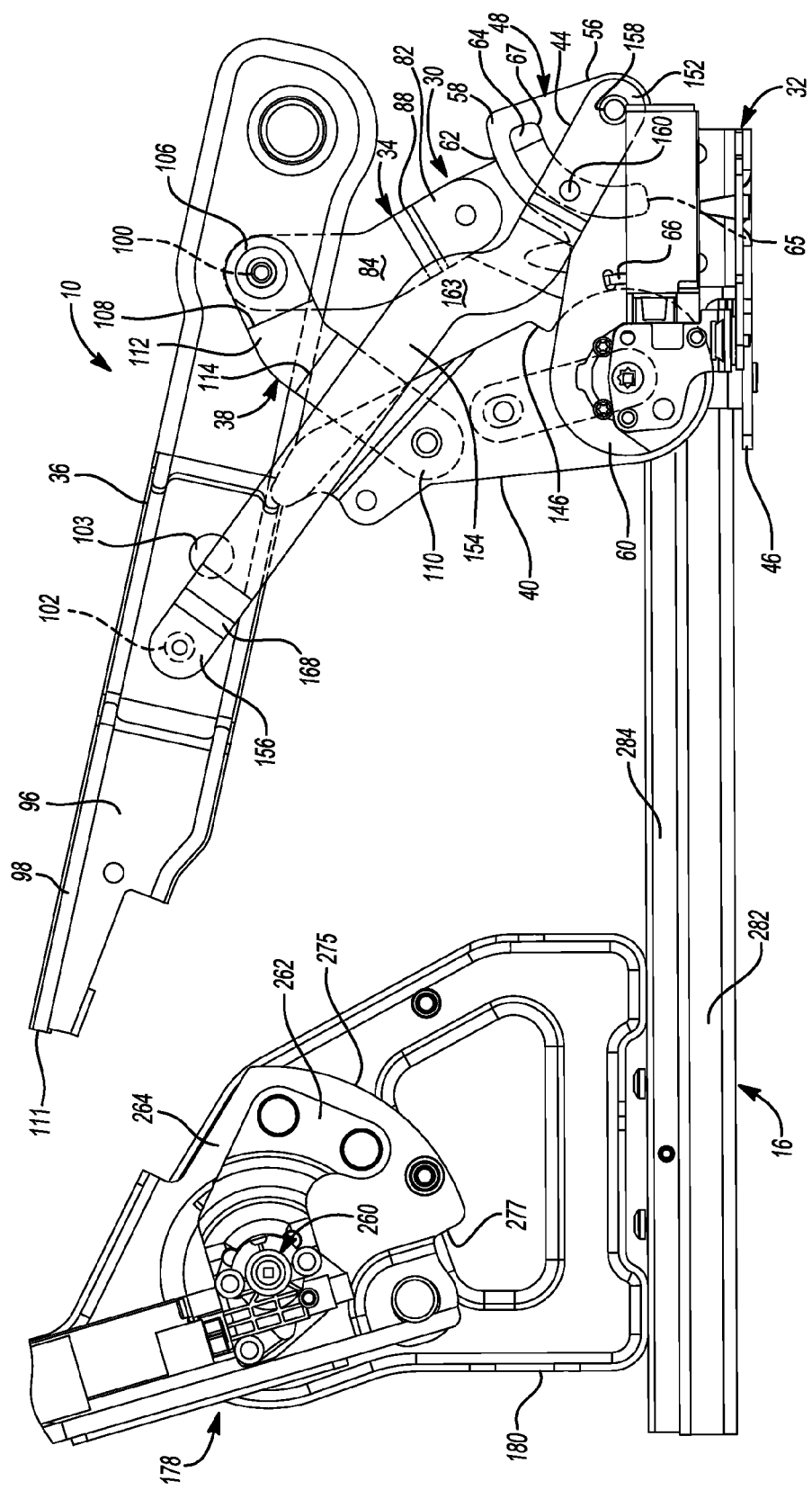
FIG. 3 is a first side view of the seat assembly of FIG. 1 in a second configuration.
Figure 4:
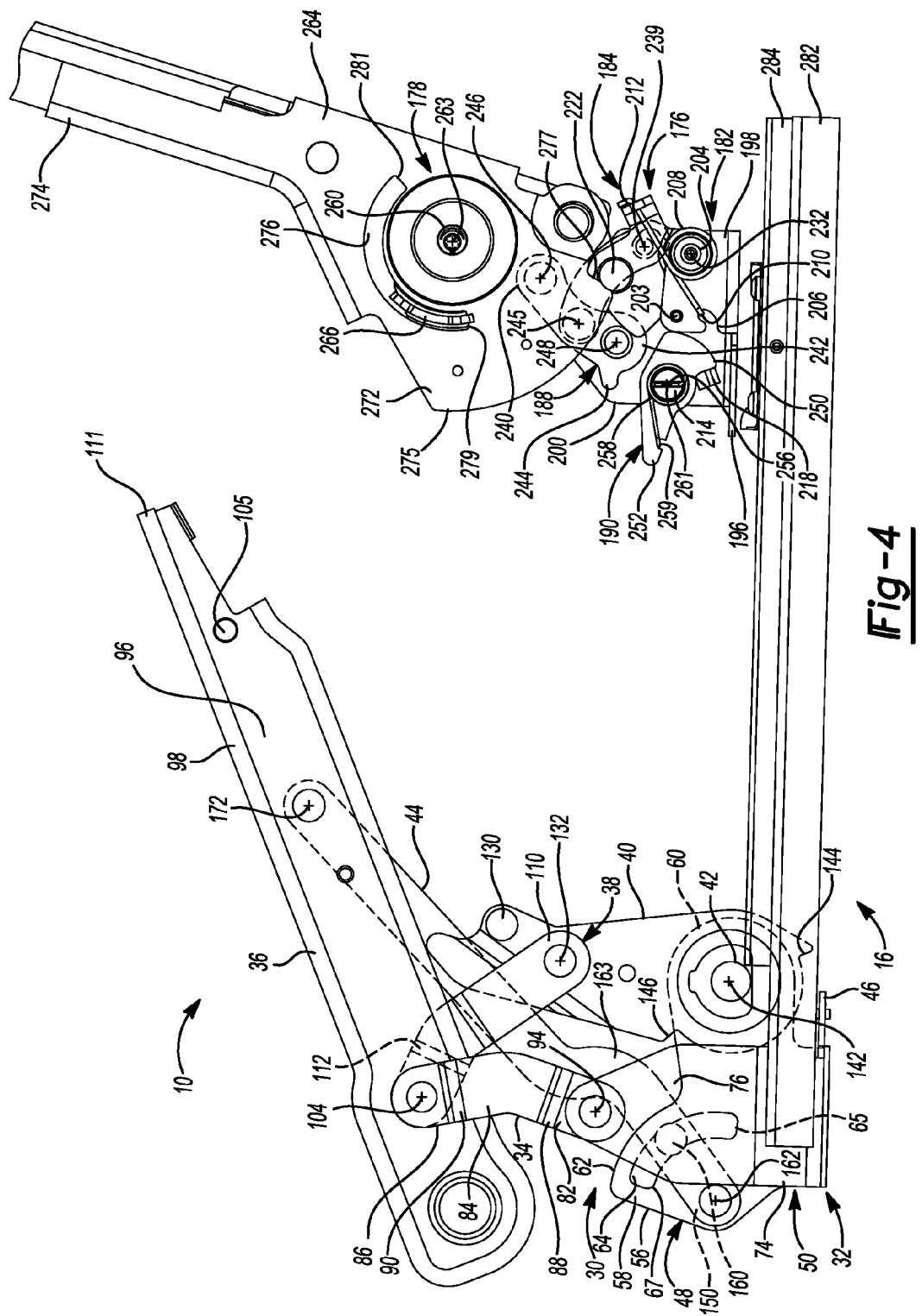
FIG. 4 is a second side view of the seat assembly of FIG. 1 in the second configuration.
Figure 6:
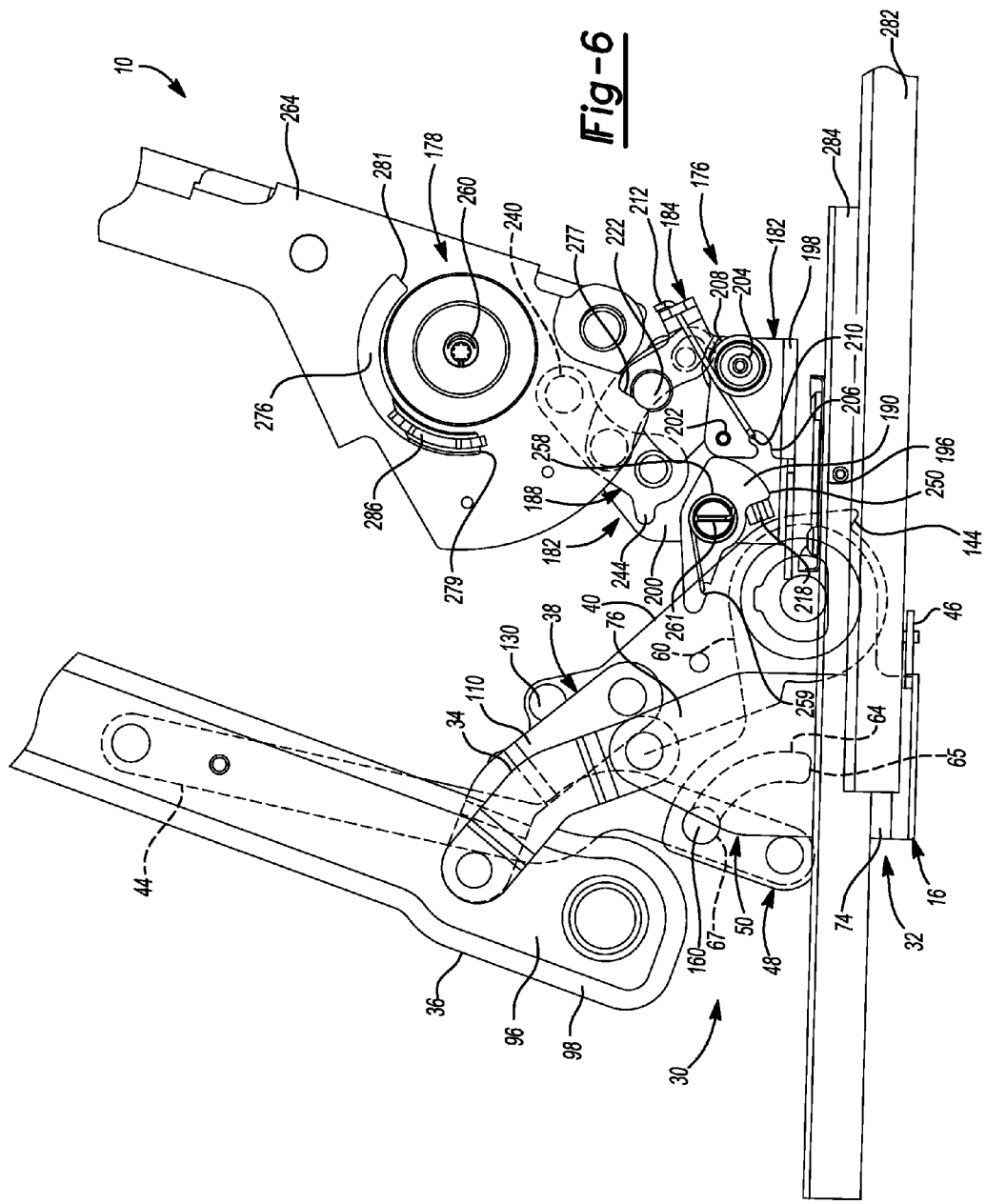
FIG. 6 is a first side view of the seat assembly of FIG. 1 in a fourth configuration.

With reference to FIGS. 3-4 and 6, in a second mode of operation, the adjustment mechanism 42 rotates the adjustment arm 40 of the seat bottom assembly 12 in the second direction about the fourth axis of rotation 142. Rotation of the adjustment arm 40 in the second direction about the fourth axis of rotation 142 causes the second arm 38 of the seat bottom assembly 12 to rotate in the first direction about the third axis of rotation 132. Rotation of the second arm 38 about the third axis of rotation 132 causes the support arm 36 and, thus, the seat bottom 28, to rotate in the second direction about the second axis of rotation 104, which will cause the first arm 34 to rotate in the second direction about the first axis of rotation 94 and cause the third arm 44 to rotate in the second direction about the fifth axis of rotation 162.

As the third arm 44 rotates about the fifth axis of rotation 162, the mounting pin 160 slides or rotates between the first end 65 of the arcuate slot 64 and the second end 67 of the arcuate slot 64. After the adjustment mechanism 42 has rotated the adjustment arm 40 by a predetermined angle (e.g., 180°), the adjustment assembly 30 reaches a third configuration (FIG. 6), in which the seat bottom 28 is substantially vertical, or perpendicular to the track 282 of the seat track assembly 16. In the third configuration, the second end 146 of the adjustment arm 40 contacts and rests against the second side 150 of the arcuate stop member 66, and the second arm 38 contacts and rests against the peg member 130, thereby preventing further rotation of the adjustment arm 40 and the adjustment assembly 30 in the second direction.

When the adjustment assembly 30 is in the third configuration, the slide mechanism 284 may slide or otherwise move within the track 282 in a first direction towards the adjustment assembly 30 and the seat bottom 28, until the seat back 174 is in a third configuration (FIG. 6), substantially parallel to the seat bottom 28.

To return the seat bottom assembly 12 and the seat back assembly 14 to the first configuration (FIG. 1) from the third configuration (FIG. 6), the slide mechanism 284 slides or otherwise moves in a second direction (opposite the first direction) within the track 282, and the adjustment mechanism 42 rotates the adjustment arm 40 in the second direction about the fourth axis of rotation 142, such that the corresponding movement and rotation of the adjustment assembly 30 is reversed relative to the movement and rotation described herein with respect to the second mode of operation.

As noted above, the memory device may store certain characteristics of the first configuration, such as the angular position of the recliner mechanism 260 and/or the adjustment mechanism 42. Prior to, and/or during, the return of the seat bottom assembly 12 and/or the seat back assembly 14 to the first configuration (FIG. 1) from the second configuration (FIG. 5) or the third configuration (FIG. 6), the memory device may communicate the certain characteristics of the first configuration to the sensor assembly 269. As the recliner mechanism 260 and/or the adjustment mechanism 42 rotate and return the seat bottom assembly 12 and/or the seat back assembly 14 to the first configuration (FIG. 1) from the second configuration (FIG. 5) and/or the third configuration (FIG. 6), the sensor assembly 269 may detect the rotational direction, angular position, and other rotational characteristics of the recliner mechanism 260 and/or the adjustment mechanism 42 to ensure that the seat back assembly 14 and/or the seat bottom assembly 12 are properly and accurately returned to the first configuration.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. In a seat assembly for a vehicle having a seat bottom having a forward end and a rearward end, a first adjustment mechanism connected to said seat bottom, a track assembly mounted to a floor of the vehicle in a fore/aft direction and including a second adjustment mechanism, and a seatback connected at a lower end thereof to said track assembly, a method of changing the configuration of the seat assembly from a first configuration wherein the seat bottom is oriented substantially parallel to said track assembly and the seatback is oriented substantially perpendicular to said track assembly, to a second configuration comprising the steps of:
    (i) operating said first adjustment mechanism to pivot said seat bottom about an axis adjacent the forward end of the seat bottom so that the seat bottom is oriented substantially perpendicular to said track assembly, and
    (ii) thereafter operating said second adjustment mechanism to slide said seatback in a forward direction along said track assembly toward said substantially perpendicularly oriented seat bottom;
    wherein the operation of the second adjustment mechanism in step (ii) occurs independently of the operation of the first adjustment mechanism in step (i).

2. In a seat assembly for a vehicle having a seat bottom having a forward end and a rearward end, a seatback, and a track assembly mounted to a floor of the vehicle in a fore/aft direction, a method of changing the configuration of the seat assembly from a first configuration wherein the seat bottom is spaced above the floor of the vehicle and oriented substantially parallel to said track assembly and the seatback is oriented substantially perpendicular to said track assembly, to a second configuration comprising the steps in sequence of:
    rotating the seatback about a first axis adjacent to a lower end of said seatback in a forward rotational direction by a first predetermined angular amount less than 90°;

lowering said seat bottom to a position adjacent to the floor of the vehicle; and continuing the forward rotation of said seatback about said first axis until the seatback is substantially parallel with said track assembly wherein the lowering of said seat bottom occurs independently of any movement of said seatback.

3. The method of claim 2, wherein the step of lowering said seat bottom is performed by rotating seat bottom in a rearward direction about a second axis adjacent to a forward end of the seat bottom.

4. The method of claim 3, wherein said seatback is prevented from rotating about said first axis in a rearward rotational direction opposite to said forward rotational direction when said seat bottom is in said position adjacent to the floor of the vehicle.

5. A seat assembly for a vehicle including a seat comprising a seat bottom having a forward end and a rearward end and a seatback having a substantially vertical orientation defining an upper end and a lower end adjacent the rearward end of the seat bottom in a first configuration of said seat assembly, the seat assembly comprising:

a track assembly mounted to a floor of a vehicle in a fore/aft direction;

a base assembly mounting the forward end of the seat bottom to the floor of the vehicle or to a forward end of said track assembly; and a support assembly mounting the lower end of the seatback to a rearward end of said track assembly;

wherein said base assembly includes a first adjustment mechanism operable to rotate said seat bottom about a first axis adjacent to the forward end of the seat bottom in a first rotational direction from a first position wherein said seat bottom is substantially parallel to the floor of the vehicle to a second position wherein said seat bottom is oriented substantially perpendicular to said floor, and further wherein said track assembly includes a second adjustment mechanism coupled to said support assembly and operable to cause forward sliding movement of said seatback along said track assembly independently of the operation of said first adjustment mechanism or the rotation of said seat bottom from said first position to said second position.

6. The method of claim 5, wherein said second adjustment mechanism is operable to cause said forward sliding movement of said seatback along said track assembly only after said seat bottom is in said second position.

7. The seat assembly of claim 5, wherein said seatback is moveable forwardly along said track assembly until the seatback is juxtaposed to said seat bottom when in said second position, thereby putting said seat assembly in a second configuration.

8. The seat assembly of claim 7, wherein said support assembly further comprises a third adjustment mechanism for permitting rotation of said seatback about a second axis adjacent to the lower end of said seatback.

9. The seat assembly of claim 8, further including a first motor assembly for operating said first adjustment mechanism, and a second motor assembly for operating said second adjustment mechanism.

10. The seat assembly of claim 8, wherein the rearward end of said seat bottom is supported by a connecting rod oriented transversely to said fore/aft direction and located in the lower end of the seatback when seat assembly is in said first configuration.

11. The seat assembly of claim 10, wherein the rearward end of the seat bottom is unsupported by said connecting rod after said third adjustment mechanism has rotated said seatback in the first rotational direction by a first predetermined angular amount less than 90°.

12. The seat assembly of claim 11, wherein said seat bottom is spaced above and substantially parallel to the floor of the vehicle in the first configuration of said seat assembly.

13. The seat assembly of claim 12, wherein said first adjustment mechanism is operable to lower said seat bottom adjacent to the floor of the vehicle when the rearward end of said seat bottom is unsupported by said connecting rod.

14. The seat assembly of claim 13, wherein said first adjustment mechanism is operable to lower said seat bottom by rotating said seat bottom about said first axis in a second rotational direction opposite said first rotational direction.

15. The seat assembly of claim 13, wherein said third adjustment mechanism is operable to rotate said seatback in said first rotational direction after said seat bottom has been lowered adjacent to the floor of the vehicle, until said seatback is substantially parallel with said track assembly, thereby putting said seat assembly in a third configuration.

16. The seat assembly of claim 15, further including an interlock mechanism that is operable to prevent said third adjustment mechanism from rotating said seatback in a second rotational direction opposite said first rotational direction when said seat bottom is adjacent to the floor of the vehicle in said third configuration of said seat assembly.

17. The seat assembly of claim 16, wherein said interlock mechanism is operable to permit rotation of said seatback by said third adjustment mechanism in said second rotational direction after said first adjustment mechanism has raised said seat bottom above the floor of the vehicle by a second predetermined amount.

* * * * *

UNITED STATES PATENT AND TRADEMARK OFFICE
CERTIFICATE OF CORRECTION

PATENT NO. : 9,827,885 B2  
APPLICATION NO. : 14/738511  
DATED : November 28, 2017  
INVENTOR(S) : Michael R. Fisher et al.

Page 1 of 1

It is certified that error appears in the above-identified patent and that said Letters Patent is hereby corrected as shown below:

In the Claims

Column 13  
Line 5, Claim 2        after "assembly", insert --,--

Column 13  
Line 46, Claim 6       delete "method" and insert --seat assembly--

Signed and Sealed this  
Fifth Day of June, 2018

Andrei Iancu  
*Director of the United States Patent and Trademark Office*